Oct. 16, 1923.
C. H. HAPGOOD
1,470,666
WEIGHING SCALE
Filed Feb. 18, 1920
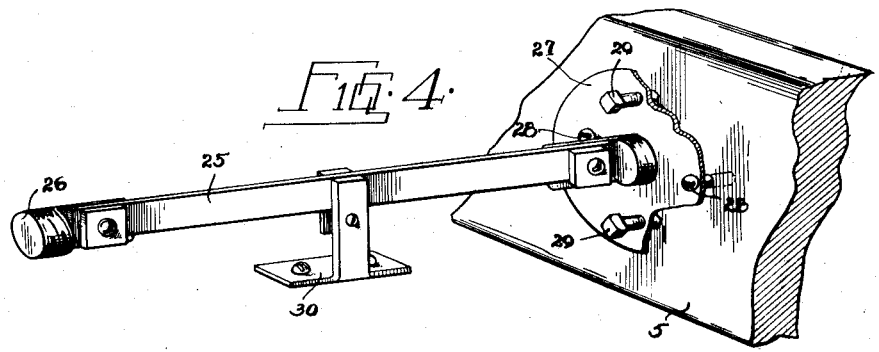
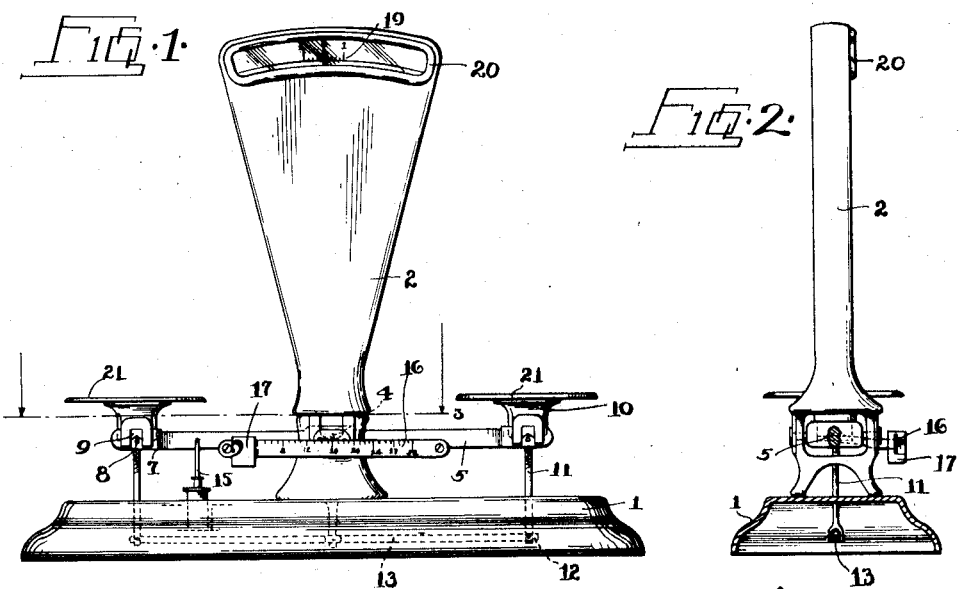
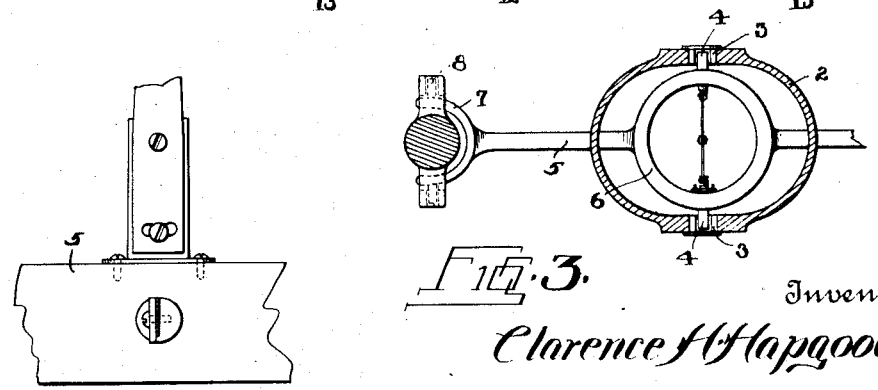
Inventor
Clarence H Hapgood
By George R. Frye
Attorney Patented Oct. 16, 1923.

1,470,666

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed February 18, 1920. Serial No. 359,750.

*To all whom it may concern:*

Be it known that I, CLARENCE H. HAPGOOD, a citizen of the United States, residing at Toledo, in the county of Lucas and State of Ohio, have invented certain new and useful Improvements in Weighing Scales, of which the following is a specification.

This invention relates to weighing scales, and has for its principal object the provision of a predetermined weight scale in which the load on the scale is counterbalanced by gravity and which will weigh correctly when out of level.

Another object of the invention is the provision of a predetermined weight scale of great sensitiveness which will automatically indicate the approximate over or under weight of the commodity being weighed.

Other objects and advantages will be apparent from the following description, in which reference is had to the accompanying drawings illustrating a preferred embodiment of my invention and in which similar reference numerals designate similar parts throughout the several views.

In the drawings:—

Figure 1 is an elevational view of a scale embodying my invention;

Figure 2 is a vertical sectional view taken adjacent the end of the beam, parts of the scale being shown in elevation;

Figure 3 is an enlarged horizontal section on the line 3—3 of Figure 1, parts being broken away;

Figure 4 is a further enlarged fragmentary detail perspective showing a balancing ribbon forming an element of my invention; and Figure 5 is a fragmentary elevation showing the connection between the lever and indicating hand.

I have shown my invention as embodied in a scale of the equal-arm or even-balance type, but it is to be understood that it is capable of embodiment as well in other types of scales, such, for example, as scales having multiplying lever systems.

The frame of the scale shown in the drawings comprises a base 1 upon which is supported a substantially fan-shaped housing 2. Mounted in the lower part of the housing is a pair of grooved bearings 3 which rockably receive the fulcrum pivots 4 of the lever 5, the central portion of which is expanded, as at 6, into the form of an annulus to space the fulcrum pivots transversely of the lever. The ends of the lever 5 are forked, as at 7, and carry load pivots 8 upon which rest inverted grooved bearings 9 carried by platform spiders 10. Spider stems 11 depend from the spiders 10, the lower ends being connected, as at 12, to check links 13, which are in turn pivoted to the frame on an axis lying directly below the axis of the fulcrum pivots 4.

For the purpose of damping the vibratory movements of the scale a dash pot containing a fluid of suitable viscosity is mounted upon the frame and a plunger (not shown) is mounted to reciprocate therein, the plunger being connected to the lever by means of a plunger rod 15.

A graduated beam 16 carrying a sliding poise 17 is shown as secured to the lever 5.

The over and under weight indicator consists of a hand which is adjustably fixed to the lever 5, as shown in Figure 5, and extends upwardly in the housing 2, its upper pointed end swinging over an arcuate chart 19 which is visible through a window 20 in the upper part of the housing 2. The zero graduation mark is in the center of the chart, and when the lever is level the indicator hand points to the zero mark. Either platform 21 may be used as a commodity-receiver, the other platform being used as a poise pan.

In scales of this type as heretofore constructed various expedients have been resorted to in order to give the lever sufficient stability of equilibrium to hold the hand at the zero mark when the scale is empty or when the loads on the platforms are equal. The most common expedient is that of positioning the axis of the fulcrum pivots above the center of mass of the lever. The indicator hand of a scale so constructed will not, however, remain on zero when the scale is out of level. In the scale of my invention the center of mass of the lever is located substantially on the axis of the fulcrum pivots so that the pendulum effect of the lever is negligible, and the scale is held at zero when empty or when the loads on the platters are equal by means of a resilient connection between the frame and the lever. In the present instance I have shown the connection as a metallic ribbon 25 secured at its center to a bracket 30 fixed within the housing 2 and having its ends secured to the annular portion of the lever 5. It is to be understood that the member 25 may be of any cross-sectional shape and that it may, if desired, be made in helical or other form or in two or more parts. In the form shown one end of the ribbon is bolted to a stud 26 which is threaded into the lever 5 and the other end is secured to a plate 27 which is connected by means of machine screws 28 to the lever 5 and is provided with a pair of set screws 29 which bear against the lever. By adjusting the machine screws the ribbon may be put under tension and by adjusting the set screws it may be so positioned that it neither causes any pressure to be exerted on the fulcrum bearings nor sustains any of the weight of the lever. No end thrust is placed upon the pivots when the ribbon is under tension. On the contrary, all end thrust is prevented, so that end thrust bearings may be dispensed with. The grooves in the fulcrum bearings may, if desired, also be dispensed with, as the ribbon will effectually hold the lever in place.

Since the center of mass of the lever is located on the axis of the fulcrum pivots the lever would balance in any position. The ribbon, however, always brings it to balance with the hand on "zero," no matter if the scale be out of level. When the loads on the platters are equal, the resilient ribbon has no effect on the weighing. Thus the weighing is done by balancing weight against weight. When, however, the load on one platter slightly exceeds that on the other, the over weight is approximately offset by the resilient force of the ribbon 25 and the amount of over weight is approximately indicated on the chart 19. The operator, therefore, knows approximately how much of the commodity to add or remove to bring the hand to zero It is to be noted that absolutely no weight is carried by the ribbon, whether the scale be loaded or empty, and that the only strains to which the resilient member is subjected are torsional.

The scale is especially useful in filling packages. If, for example, it is desired to fill pound boxes of candy, an empty box and a one pound poise are placed upon the poise pan. Each box to be filled is then placed upon the commodity platter and enough candy is put into it to bring the hand to zero. The boxes on the platforms balance each other and the candy is balanced by the poise.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a scale, in combination, a frame, a lever, fulcrum pivots supporting said lever upon said frame, and resilient means in substantial alignment with the axis of said pivots connecting said lever and said frame.

2. In a scale, in combination, a frame, a lever fulcrumed thereon, a resilient member secured to said lever and said frame and adapted to be torsionally stressed when said lever is moved from zero position, and means acting axially of the fulcrum of said lever for putting said resilient member under tension.

3. In a scale, in combination, pivotally connected frame and lever members, non-supporting resilient means connected at laterally spaced points to one of said members and intermediately connected to the other of said members.

4. In a scale, in combination, frame and lever members pivots operatively connecting said frame and lever members and resilient means tensioned between laterally spaced points on one of said members and intermediately connected to the other of said members 5. In a scale, in combination, pivotally connected frame and lever members, resilient means connected at laterally spaced points to one of said members in substantial alignment with the pivotal axis thereof and intermediately connected to the other of said members.

6. In a weighing scale, in combination, a frame, a lever pivoted thereon, a resilient member connected to said lever at laterally spaced points in substantial alignment with its pivotal axis and intermediately connected to said frame.

7. In a weighing scale, in combination, a frame, a lever pivoted thereon, a resilient member tensioned between laterally spaced points on said lever in substantial alignment with its pivotal axis, said resilient member being intermediately connected to said frame.

8. In a weighing scale, in combination, a frame, a lever having aligned fulcrum pivots supported by said frame and an opening between said pivots, and a resilient member in said opening and connected to said lever and frame at points in substantial alignment with said pivots.

9. In a weighing scale, in combination, a frame, a lever having aligned fulcrum pivots supported by said frame and an opening between said pivots, and a resilient member in said opening tensioned between points on said lever in substantial alignment with said pivots and intermediately connected to said frame.

CLARENCE H. HAPGOOD.

Witnesses:
C. E. WILCOX,
C. O. MARSHALL.